United States Patent
Tubbs et al.

(10) Patent No.: US 7,376,769 B1
(45) Date of Patent: May 20, 2008

(54) WIRELESS COMPUTING DEVICE HAVING AN APPLICATION AND WIRELESS SUBSYSTEM AND METHOD THEREFORE

(75) Inventors: Graham S. Tubbs, Phoenix, AZ (US); Michael S. Chartier, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 982 days.

(21) Appl. No.: 09/661,841

(22) Filed: Sep. 14, 2000

(51) Int. Cl.
*G06F 13/12* (2006.01)

(52) U.S. Cl. .................. 710/62; 710/22; 702/120

(58) Field of Classification Search ............ 710/22, 710/62; 702/120
See application file for complete search history.

(56) References Cited

U.S. PATENT DOCUMENTS

| | | | |
|---|---|---|---|
| 5,748,084 A * | 5/1998 | Isikoff | 340/568.1 |
| 5,884,103 A * | 3/1999 | Terho et al. | 710/72 |
| 5,903,849 A * | 5/1999 | Selin et al. | 455/557 |
| 6,044,452 A * | 3/2000 | Birch et al. | 712/28 |
| 6,292,858 B1 * | 9/2001 | Inkinen et al. | 710/301 |
| 6,370,591 B2 * | 4/2002 | Kaihlaniemi | 709/321 |
| 6,427,165 B1 * | 7/2002 | Anderson | 709/217 |
| 6,434,644 B1 * | 8/2002 | Young et al. | 710/63 |
| 6,459,896 B1 * | 10/2002 | Liebenow | 455/425 |
| 6,498,999 B1 * | 12/2002 | Reise | 702/120 |
| 6,622,031 B1 * | 9/2003 | McCleary et al. | 343/702 |
| 6,684,324 B2 * | 1/2004 | Floman et al. | 713/1 |

* cited by examiner

*Primary Examiner*—Niketa Patel

(57) ABSTRACT

Briefly, in accordance with one embodiment of the invention, a portable computing or communication device may include an application subsystem coupled to a wireless subsystem with an interface. The interface may provide isolation between the application subsystem and the wireless subsystem.

21 Claims, 2 Drawing Sheets

WIRELESS COMPUTING DEVICE HAVING AN APPLICATION AND WIRELESS SUBSYSTEM AND METHOD THEREFORE

BACKGROUND

Wireless communication systems are often regulated by governing agencies (e.g. state or national governments) to reduce the risk that one communication system interferes with another. Regulations are typically implemented through cellular standards that define the conditions under which transmissions made be made. For example, a standard may describe how a base station or a cellular phone may transmit a message. Consequently, the standards strongly tie together the operation of the components of a cellular system and provide little, if any, flexibility in how the components of the system may operate.

To further reduce the risk of interference between communication systems, governing agencies often require that a wireless product be thoroughly tested before is may be permitted to be used in a particular market. Such testing is referred to as type approval and is intended to determine if a particular wireless product operates properly within the standard and not interfere with other wireless communications. However, if even the slightest of modifications is made with a new model of a product (e.g., a new feature or form factor), the new product usually has to go through the entire type approval process.

Consequently, the standards used to govern wireless communications system make it difficult for third parties to develop new applications or add new features to wireless computing or communication devices. Thus, there is a continuing need for ways to allow applications and features to be added to wireless devices.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
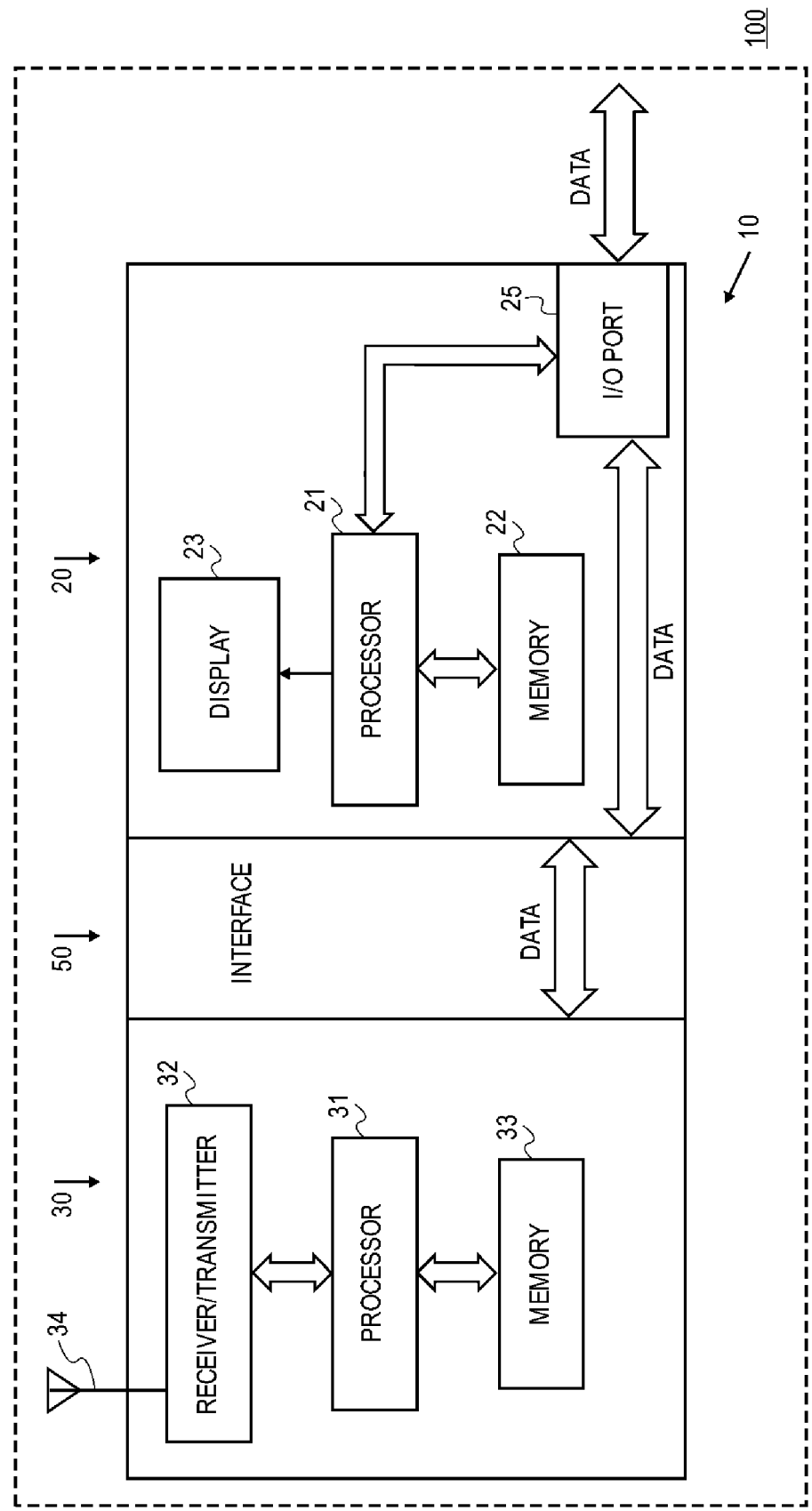
FIG. 1 is a block diagram representation of an embodiment of a portable device in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may also mean that two or more elements are in direct physical or electrical contact. However, "coupled" may also mean that two or more elements are not in direct contact with each other, but yet still co-operate or interact with each other.

It should be understood that the present invention may be used in a variety of applications. Although the present invention is not limited in this respect, the circuit disclosed herein may be used in many apparatuses such as in the transmitters and receivers of a radio system. Radio systems intended to be included within the scope of the present invention include, by way of example only, cellular radiotelephone communication systems, two-way radio communication systems, one-way pagers, two-way pagers, personal communication systems (PCS), personal digital assistants (PDA's) and the like.

Types of cellular radiotelephone communication systems intended to be within the scope of the present invention include, although not limited to, Direct Sequence—Code Division Multiple Access (DS-CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, and Extended-TDMA (E-TDMA) cellular radiotelephone systems Turning to FIG. 1, an embodiment 100 in accordance with the present invention is described. Embodiment 100 may comprise a portable computing or communication device 10 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples.

Portable device 10 may comprise an application platform 20 and a communication platform 30 that are coupled together with an interface 50. Although the scope of the present invention is not limited in this respect, application platform 20 may allow a user to execute a variety of application programs such as email, calendaring, address books, etc. Application platform 20 may also execute any application that are commonly executed on a desktop system, such as, for example, word processing, financial programs, etc.

Application platform may comprise a processor 21 such as, for example, a complex instruction set (CISC) processor, a reduced instruction set (RISC) processor, or the like. Processor 21 may be coupled to an Input/Output (I/O) port 25 that may be used to receive or transmit data from a user. For example, I/O port 25 may be a keyboard, keypad, trackball, or the like. I/O port 25 may be used to select which program(s) are to be executed by processor 21 or to provide application platform 20 with data from the user.

I/O port 25 may also be used to provide communication platform 30 with data. For example, a user may provide the phone number that is to be used to initiate a wireless communication. In this particular embodiment, I/O port 25 may be coupled to both application platform 20 and communication platform 30 to reduce the number of input ports, and thus, the form factor for portable device 10. However, in alternative embodiments, application platform 20 and communication platform 30 may have separate I/O ports.

Application platform 20 may also comprise a memory 22, such as SRAM, that may be used to store data or instructions for processor 21. Memory 22 may also comprise non-volatile storage devices such as flash memory, a disk drive or the like. Application platform 20 may also comprise a display device 23 such as a liquid crystal display (LCD) to display information associated with programs being executed on either application platform 20 or communication platform 30.

Communication platform 30 may comprise a receiver/transmitter (RT) unit 32 coupled to an antennae 34. A processor 31 may be used to process the wireless communications received by RT unit 32 or to be transmitted by communication platform 30. Processor 31, may comprise a CISC processor, a RISC processor, a digital signal processor, or any combination thereof. In this particular embodiment, processor 31 may be use to process communications independently from processor 21 of application platform 20. For example, processor 31 may be used to transmit or receive communications even if processor 21 is not in operation or is powered off.

Processor 31 may be coupled to a memory 33 that may comprise, for example, volatile memory, such as SRAM, or non-volatile memory, such as flash. Memory 31 may be used to store communications received by communication platform 30 or to store user profile data (e.g., security or identification data) that may be used to transmit a communication. At least one advantage of this particular embodiment is that memory 33 and memory 22 may be separate from each other and be operated independently. This may be advantageous in that wireless platform 30 may be operated independently from application platform 20 and vice versa. This may also provide power savings since either memory 22 or 33 may be power off when not in use. It should also be understood that communication platform 30 may comprise other components, such as filters, A/D converters, etc (not shown) that may be used to transmit or receive wireless communications.

Portable device 10 may also comprise an interface 50 to couple application platform 20 and communication platform 30. Interface 50 may comprise, for example, a PCMIA interface, a serial bus, or other connections to exchange information when appropriate. For example, interface 50 may allow application platform 20 to initiate a communication with communication platform 30 or may permit communication platform 30 to provide application platform 20 with data that received with a communication.

In addition, interface 50 may allow application platform 20 and communication platform 30 to operate independently from each other. For example, interface 50 may, among other things, control the flow of data or commands between application platform 20 and communication platform 30. Consequently, interface 50 may isolate, either in whole or part, application platform 20 and communication platform 30 from each other. By controlling the flow of data or commands, interface 50 may reduce the risk that application platform 20 inappropriately transmits a message or interferes with other communication systems by causing communication platform 20 to malfunction. This may be desirable to reduce the risk that a virus on application platform 20 infects or affects communication platform 30. This, in turn, may reduce the risk that communication platform 30 inappropriately affects the communication system with which it is in communication. Likewise, interface 50 may also control or restrict the flow of information that is shared from communication platform 20 to application platform 30.

Interface 50 may also provide a standard or uniform technique for sharing information between application platform 30 and communication platform 20. For example, interface 50 may permit processor 21 and processor 31 to share information (e.g., information stored in memory 22 or 33), or may couple communication platform 30 to I/O port 20 so that a user may provide data or commands to communication platform 30. This may provide the flexibility of writing or executing computer programs (e.g., applications, operating systems, etc) on application platform 20 without having to tailor the computer programs to the particular protocol employed by communication platform 30. Accordingly, interface 50 may permit applications to be develop for portable device 10 without having to undergo the formal and time consuming type-approval process.

Figure 2:
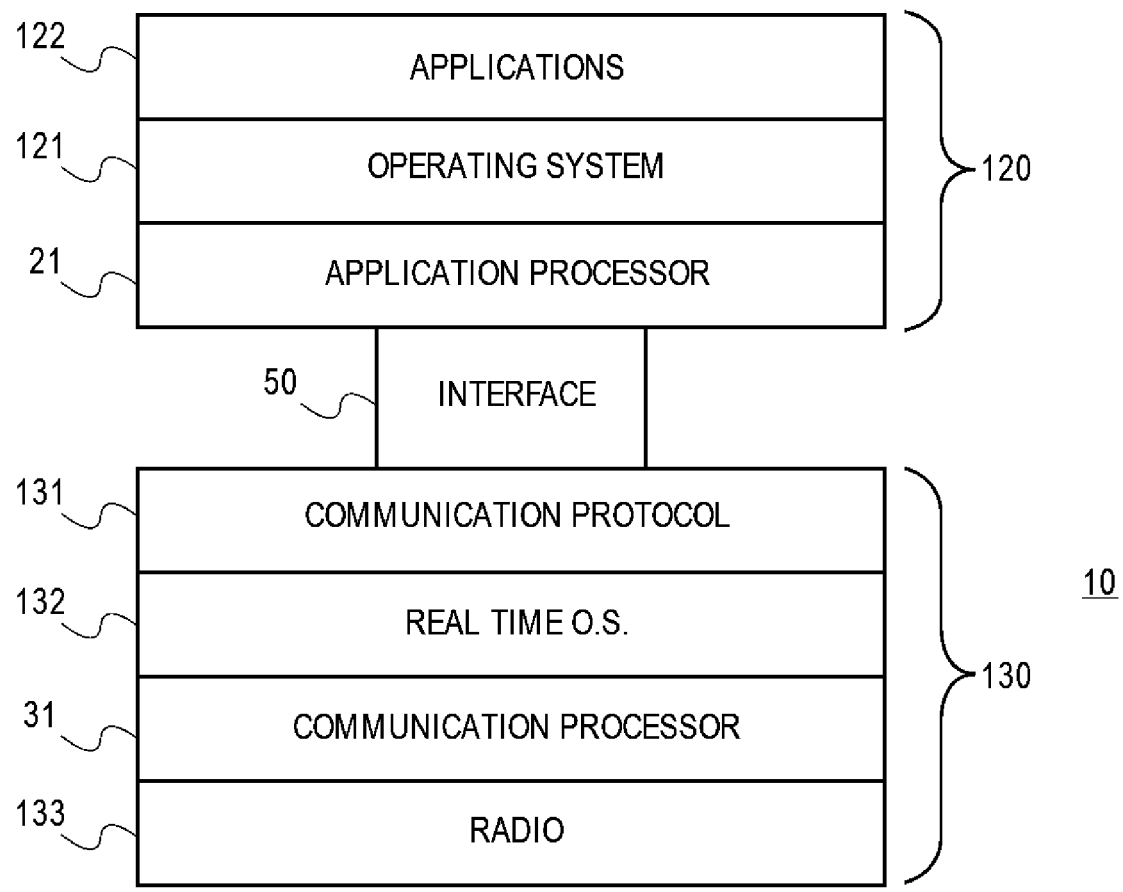
FIG. 2 is a module diagram representing the relationship between programs executed on a portable device in accordance with an embodiment of the present invention.

Referring now to FIG. 2, an example of how interface 50 may be used to isolate an application platform from a communication platform in accordance with an embodiment of the present invention is provided. FIG. 2 is intended to illustrate how various modules or computer programs of an application platform and a wireless platform may be arranged with respect to each other. In this particular example, portable device 10 may comprise a application subsystem 120 that is couple to a wireless subsystem 130 by interface 50. Application subsystem 120 may include an operating system 121 and applications 122 that are executed on processor 21 (see FIG. 1).

Applications 131 may also be executed on processor 21 and include programs intended to process the data provide by a user through an input port (e.g. I/O port 25 of FIG. 1), from wireless subsystem 130, or both, although the invention is not limited in this respect.

Wireless subsystem may comprise a communication protocol module 131 that may be used to implement that particular communication standard employed by portable device 10. The communication protocol may be implemented with a real time operating system 132 executing on a processor (e.g., processor 31 of FIG. 1). Wireless subsystem 133 may also comprise a radio 133 that may be implemented in hardware, software, or a combination thereof. As shown, interface 50 provides isolation between application subsystem 120 and wireless subsystem 130 so that applications may be executed on application subsystem 120 regardless of the particular communication protocol 131 implemented by wireless subsystem 130.

Interface 50 also provides for the appropriate and control sharing of data between application subsystem 120 and wireless subsystem 130. For example, interface 50 may permit application platform 120 to initiate or receive a communication using wireless subsystem 130. Interface 50 may also permit a user to provide wireless subsystem 130 with data through an input port (e.g., I/O port 25 of FIG. 1). Consequently, in this particular embodiment, interface 50 may provide sufficient isolation so that applications may be run on application subsystem 120 without interfering with wireless subsystem 130, while at the same time, allowing applications to process the data received through wireless communications. It should be understood that in various embodiments of the present invention, interface 50 may comprise various levels of intelligence or sophistication that provides isolation between application subsystem 120 and wireless subsystem 130. Alternatively, however, interface 50 may not comprise any intelligence and simply be a data path between application subsystem 120 and wireless subsystem 130.

While certain features of the invention have been illustrated and described herein, many modifications, substitutions, changes, and equivalents will now occur to those skilled in the art. For example, application platform 20 and wireless platform 30 may share a common power source, while in alternative embodiments, application platform 20 and wireless platform 30 may have independent power sources that permit processors 21 and 31 to be operated independently. It is, therefore, to be understood that the appended claims are intended to cover all such modifications and changes as fall within the true spirit of the invention.

The invention claimed is:

1. A mobile communication device comprising:
    a first processor adapted to execute a user application;
    a second processor adapted to process a wireless communication, wherein the second processor is capable of initiating the wireless communication independently of the first processor; and
    an input port coupled to the first processor and the second processor;
    wherein the input port is configured to supply data to the second processor for the wireless communication.

2. The mobile communication device of claim 1, further comprising a display, wherein the first processor and the second processor are further adapted to display information on the display.

3. The mobile communication device of claim 1, further comprising an interface adapted to couple the first processor to the second processor.

4. The mobile communication device of claim 3, wherein the interface comprises a Peripheral Components Interface bus.

5. The mobile communication device of claim 3, wherein the interface comprises a serial bus.

6. The mobile communication device of claim 3, wherein the interface is adapted to provide the second processor user data from the input port.

7. The mobile communication device of claim 1, further comprising:
    a first memory coupled to the first processor; and
    a second memory coupled to the second processor.

8. The mobile communication device of claim 1, further comprising:
    a first power source coupled to the first processor; and
    a second power source coupled to the second processor.

9. The mobile communication device of claim 1, wherein the second processor comprises a digital signal processor.

10. The mobile communication device of claim 1, wherein the first processor is further adapted to execute a user application independently of the second processor.

11. A mobile communication device comprising:
    a non-volatile memory;
    an input port to receive data from a user;
    an application subsystem coupled to the input port; and
    a wireless subsystem coupled to the input port and to the non-volatile memory; wherein the wireless subsystem is configured to initiate a wireless communication with the data from the user independent of the application subsystem.

12. The mobile communication device of claim 11, further comprising an interface to couple the application subsystem to the wireless subsystem.

13. The mobile communication device of claim 12, wherein the interface comprises a serial interface.

14. The mobile communication device of claim 12, wherein the interface couples the wireless subsystem to the input port.

15. The mobile communication device of claim 11, wherein the wireless subsystem comprises a digital signal processor.

16. The mobile communication device of claim 15, wherein the wireless subsystem further comprises a transmitter and a receiver.

17. The mobile communication device of claim 11, wherein the application subsystem is adapted to execute a user application and process data provided with the input port.

18. A method of processing a communication comprising:
    providing data to an application subsystem from a user through an input port; and
    providing other data to a wireless subsystem from the user through the input port to initiate a wireless communication independent of the application subsystem, the wireless subsystem and the application subsystem being within a mobile communication device.

19. The method of claim 18, wherein providing data to the application subsystem includes providing data through an interface.

20. The method of claim 19, further comprising executing an application with the application subsystem independently of the wireless subsystem.

21. The method of claim 18, wherein providing data to the wireless subsystem includes providing data through an interface.

* * * * *